United States Patent [19]
Ross et al.

[11] Patent Number: 5,063,619
[45] Date of Patent: Nov. 12, 1991

[54] VACUUM BREAKER FOR BIDET

[75] Inventors: Gilbert W. Ross, Zionsville; Scott C. Baker, Lebanon; Svend Demant, Frankfort, all of Ind.

[73] Assignee: U.S. Tap, Inc., Frankfort, Ind.

[21] Appl. No.: 532,024

[22] Filed: Jun. 1, 1990

[51] Int. Cl.[5] .............................................. A47K 3/22
[52] U.S. Cl. ...................................... 4/443; 137/218; 137/512.3
[58] Field of Search .................... 4/443, 444, 446, 447, 4/445, 448, 420.1–420.5; 137/218, 512.3

[56] References Cited

U.S. PATENT DOCUMENTS

| 3,424,188 | 1/1969 | Whitaker et al. | 137/218 |
| 3,447,559 | 6/1969 | McCornack | 137/218 |
| 3,754,709 | 8/1973 | Laatsch | 137/218 X |
| 4,553,560 | 11/1985 | Tucker et al. | 137/218 |
| 4,589,438 | 5/1986 | Breda | 137/218 |
| 4,984,306 | 1/1991 | Sumerix | 137/218 X |

FOREIGN PATENT DOCUMENTS

| 211747 | 10/1960 | Fed. Rep. of Germany | 4/446 |
| 190086 | 6/1964 | Sweden | 4/446 |
| 430605 | 8/1967 | Switzerland | 4/443 |
| 451252 | 7/1936 | United Kingdom | 4/446 |

OTHER PUBLICATIONS

"Toilets & Bidets", 1986, Eljer Brochure 4 pgs.

Primary Examiner—Henry J. Recla
Assistant Examiner—Robert M. Fetsuga
Attorney, Agent, or Firm—Woodard, Emhardt, Naughton Moriarty & McNett

[57] ABSTRACT

A vacuum breaker assembly for a bidet including a vacuum breaker body defining a fluid passageway therethrough and a vacuum breaker opening communicating with the fluid passageway. A piston check valve is movably received within the fluid passageway and moves between positions wherein the vacuum breaker opening is open and closed. A duckbill check valve is fixedly recived within the fluid passageway of the vacuum breaker body upstream of the piston check valve, thereby providing additional protection against backflow of contaminated water through the device. Flexible conduits are connected to the vacuum breaker body inlet and outlet and communicate with a suitable potable water source.

18 Claims, 6 Drawing Sheets

VACUUM BREAKER FOR BIDET

BACKGROUND OF THE INVENTION

The present invention relates generally to plumbing fixtures and, more particularly, to vacuum breakers for plumbing fixtures, especially bidets.

Plumbing codes for certain types of fixtures, such as bidets, require vacuum breakers as protection against possible reverse siphoning and backflow of contaminated water into the potable water source. Certain codes require the vacuum breaker to properly seal against this reverse flow situation even when fouling conditions are present. Further, depending upon the particular situation and the variance among different plumbing codes, the installation requirements for these vacuum breakers, such as the height of the vacuum breaker air intake above the fixture rim, may vary considerably. Previous vacuum breakers have met these requirements and others with limited success. Such breakers have been susceptible to failure when relatively large objects are present in the backflow that prevent the valve inside the breaker from closing against the reverse flow. In addition, installation of such breakers is made difficult because of the need to line up rigid pipe conduits to fit various bidet china configurations and bidet fitting side valve configurations. Another disadvantage of no small significance to the purchaser is the negative aesthetics present in previous breaker designs with the exposed pipes and fittings.

SUMMARY OF THE INVENTION

A vacuum breaker for a faucet connected to a potable water source, according to one embodiment of the present invention comprises a vacuum breaker body defining a fluid passageway having an inlet connected to the potable water source, an outlet and a vacuum breaker opening communicating exteriorly of the vacuum breaker assembly to ambient air. There is further provided a piston valve movably received within the fluid passageway of the vacuum breaker body, the piston valve moving between a first position wherein the vacuum breaker opening is open and a second position wherein the vacuum breaker opening is closed. The invention is additionally characterized by a valve seal associated with the piston valve and the vacuum breaker opening in the vacuum breaker body. The piston valve defines a seating surface sized and shaped to close the vacuum breaker opening by sealing contact with the valve seal. In addition, a duckbill valve is fixedly received within the fluid passageway in communication with the piston valve.

Accordingly, it is an object of the present invention to provide an improved vacuum breaker for a faucet connected to a potable water source.

It is a further object of the present invention to provide an improved vacuum breaker which is particularly suited for use with a bidet fixture.

Another object of the present invention is to provide an improved vacuum breaker which provides increased protection against reverse flow of contaminated water through the device.

A yet further object of the present invention is to provide an improved vacuum breaker which is a fit-all design that will mount to any diverter type of bidet fixture and meet installation requirements that call for the use of a vacuum breaker.

An additional object of the present invention is to provide an improved vacuum breaker which eliminates critical dimensional or alignment factors and simplifies on-site assembly requirements.

DESCRIPTION OF THE PREFERRED EMBODIMENT

Figure 1:
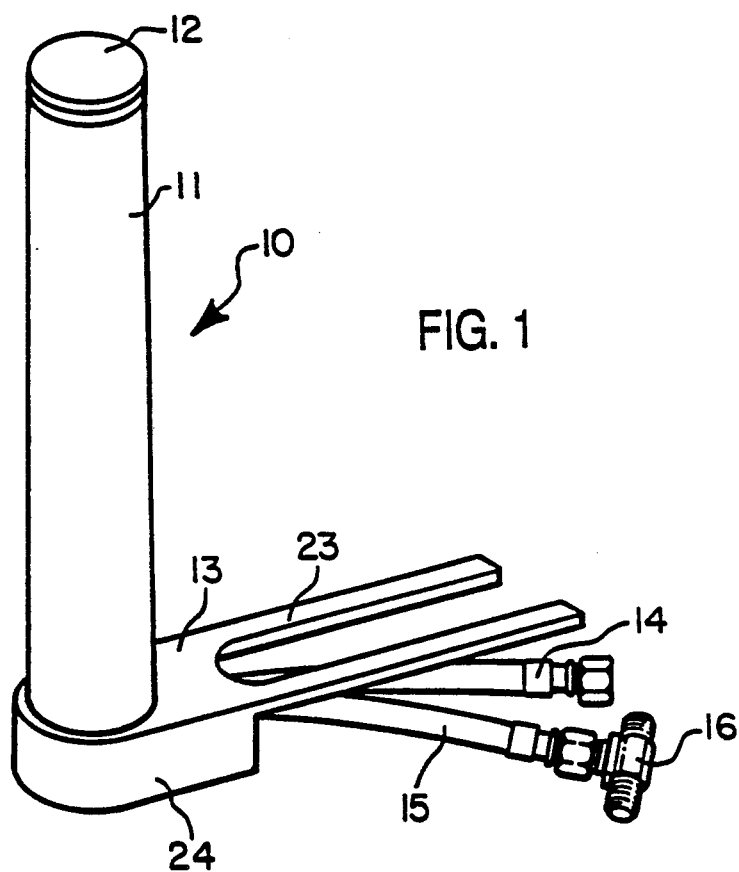
FIG. 1 is a perspective view showing the preferred embodiment of the vacuum breaker assembly of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is generally designated at 10 the vacuum breaker assembly of the present invention the exteriorly visible components of which include a tubular outer housing 11, a top cap 12, a skirted mounting bracket 13, flexible discharge and supply hoses 14 and 15, respectively. Mounting bracket 13 includes a U-shaped portion which extends forwardly of tubular housing 11 for mounting to a lavatory bidet in a manner to be described herein. Housing 11, cap 12 and bracket 13 are formed so as to hide from view interior components of assembly 10 and are therefore preferably provided with an aesthetically pleasing decorative finish, such as polished chrome.

Figure 2:
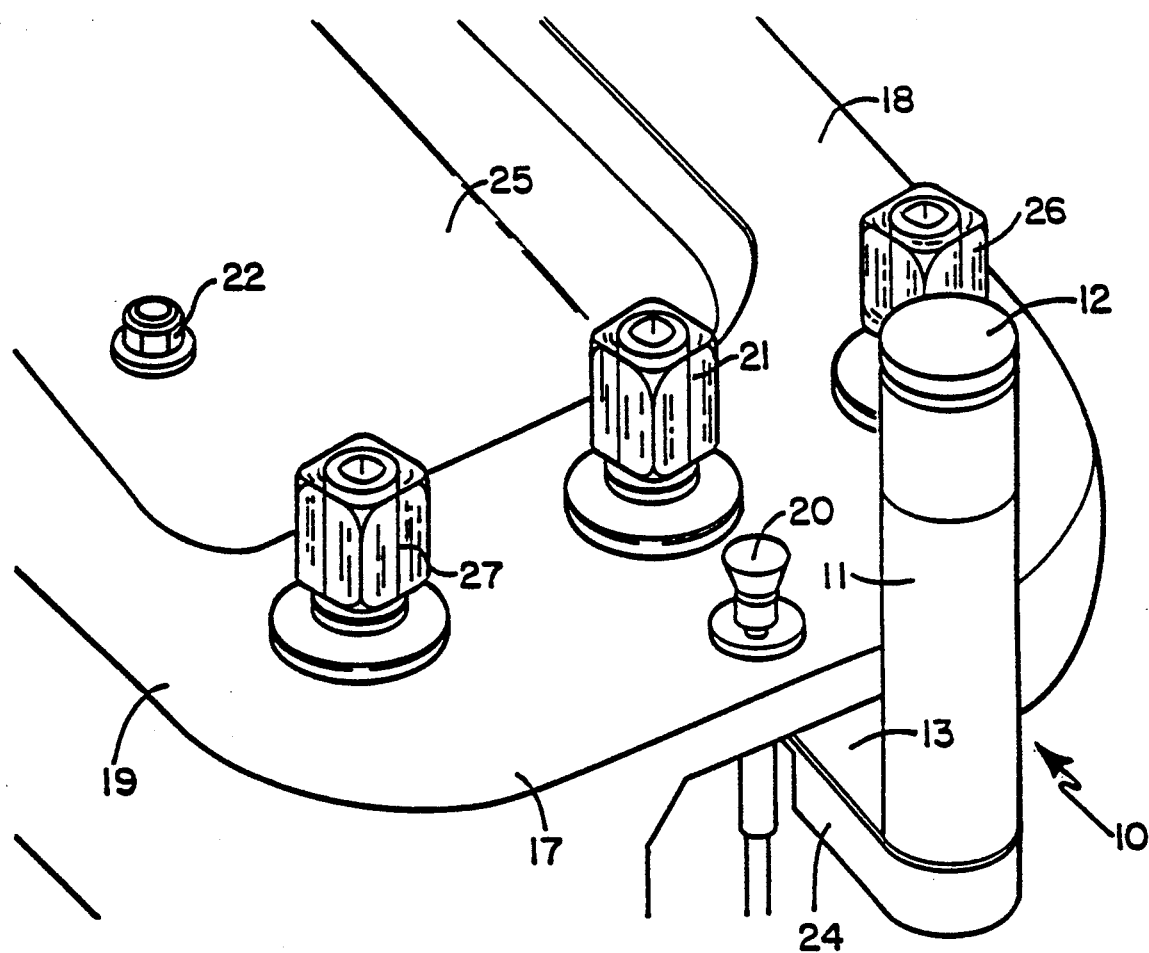
FIG. 2 is a fragmentary perspective view showing the vacuum breaker assembly in its mounted position on a bidet.

FIG. 2 shows vacuum breaker assembly 10 fully assembled and mounted to a lavatory bidet 18. The bidet 18 generally includes a bidet china fixture 19 having a rear shelf 17 upon which is mounted hot and cold faucet handles 26 and 27, a spray faucet handle 21 which activates a diverter valve that sends water to douche spray head 22, and a lift knob 20 which activates a drain plug 28 inside basin 25. It should be understood that vacuum breaker assembly 10 is a "fit-all" construction adapted to mount to bidets of various shapes and constructions having a diverter valve for a douche spray head and may with minor modification to the mounting bracket mount to bidets not having a diverter valve. Thus, bidet 18 is of representative construction only.

Figure 4:
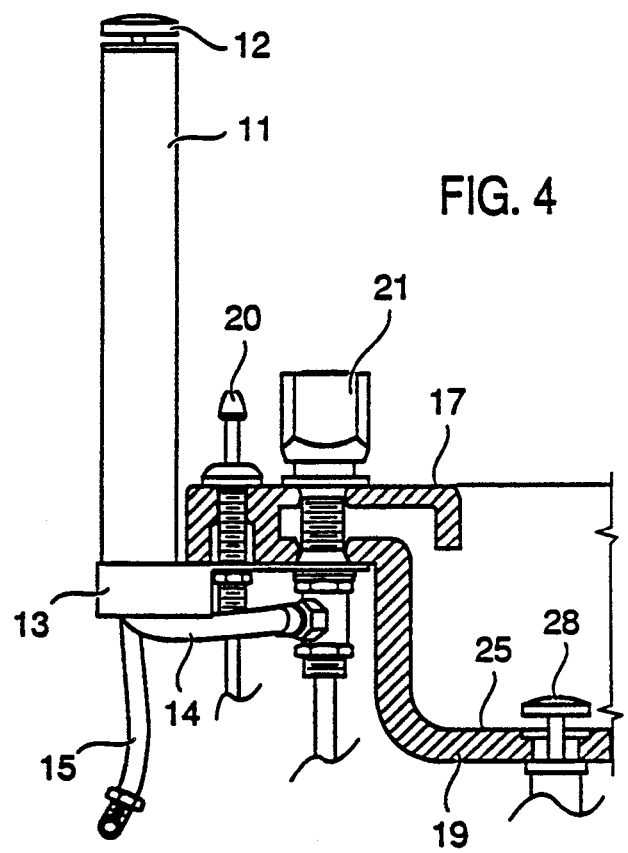
FIG. 4 is a fragmentary sectional view showing the vacuum breaker assembly in its mounted position on a bidet.

As shown in FIGS. 2 and 4, vacuum breaker assembly 10 is mounted to the underside of rear shelf 17 of bidet 18 by way of attachment of the U-shaped portion 23 of skirted mounting bracket 13 around the mountings for lift knob 20 and spray faucet handle 21. The provision of mounting bracket 13 thus eliminates the need of prior vacuum breaker assemblies for a supporting wall bracket. The plumbing connections are accomplished by connecting flexible supply hose 15 to the hot and cold supply lines to bidet 18 via tee connection 16 and connecting flexible discharge hose 14 to the diverter valve for douche spray head 22. The skirted portion 24 of bracket 13 extends downwardly contiguously of tubular housing 11 and also extends forwardly of tubular housing 11 a sufficient distance such that in its mounted position on bidet 18 the flexible hoses 14 and 15 are effectively hidden from view.

Figure 3:
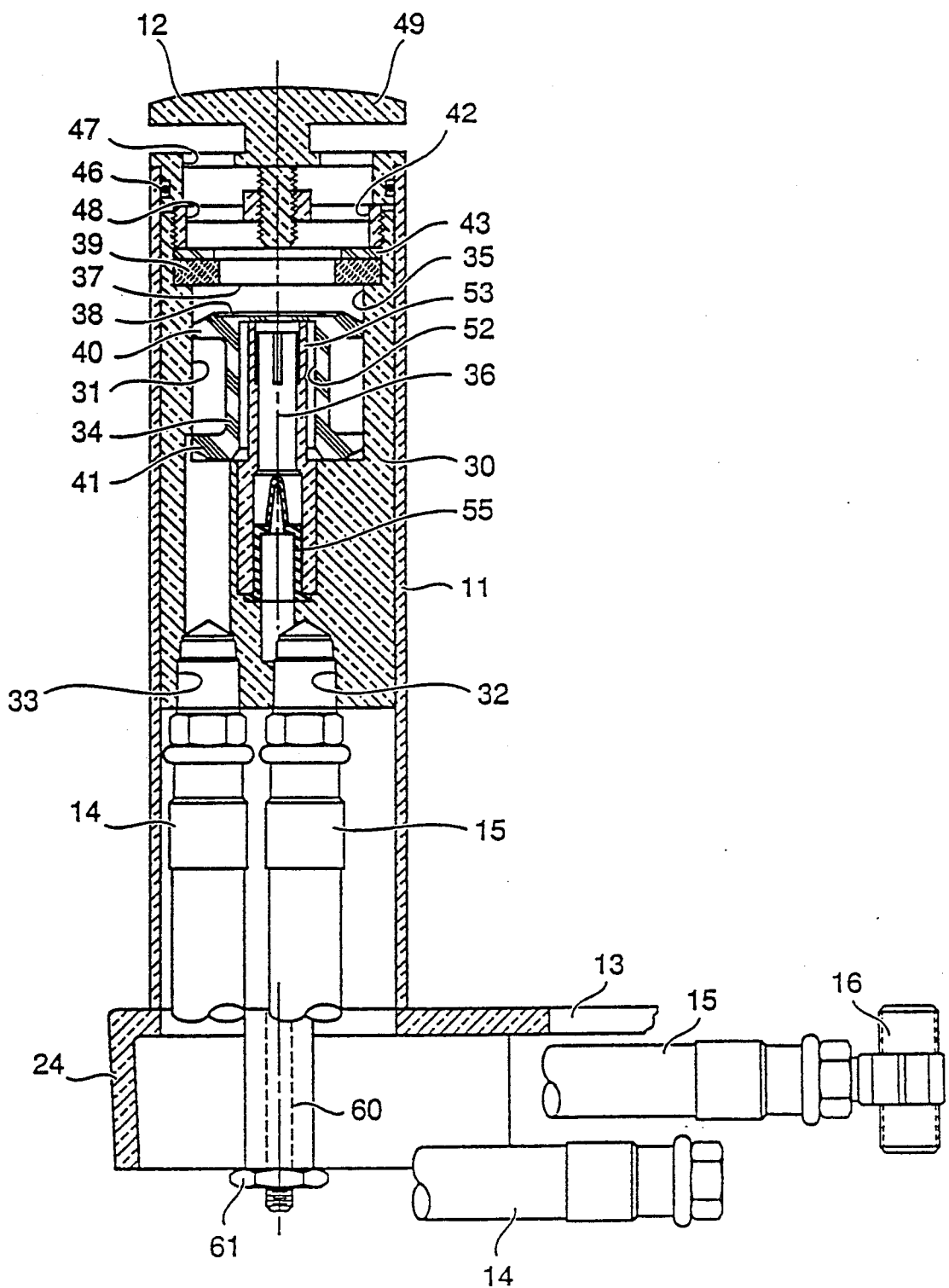
FIG. 3 is a fragmentary sectional view of the vacuum breaker assembly with the piston check valve and duckbill check valve in the positions they would assume during a reverse flow condition.

Referring now to FIG. 3, details of the interior construction of vacuum breaker assembly 10 will now be described. Vacuum breaker assembly 10 is seen to include a generally cylindrically shaped body 30 defining a fluid passageway 31 which communicates between an inlet 32 connected to flexible supply hose 15 and an outlet 33 connected to flexible discharge hose 14. Tubular housing 11 has a sufficient overall length such that the vacuum breaker opening will meet plumbing code height requirements relative to the bidet rim when in its mounted position on bidet 18. A portion of passageway 31 is defined by a piston chamber 35 within which rides a piston check valve 34 along vertical axis 36. At the uppermost end of chamber 35 is an opening 37 which communicates via a series of passageways to the exterior of assembly 10 to outside ambient air, thereby serving as a vacuum breaker when valve 34 is in the open position as will be fully described later herein.

A resilient rubber washer 39 is received insided body 30 directly above chamber 35. At the uppermost end of piston check valve 34 is a flat seating surface 38 which sealing abuts against resilient rubber washer 39 to close off opening 37 when the piston check valve 34 is at the upper limit of travel. A fitting 42 is threadably fastened to body 30 and along with metal washer 43 fixedly retains rubber washer 39 in position. Fitting 42 is provided with a screw threaded aperture aligned on axis 36 into which top cap 12 fastens by screw engagement therewith. A resilient O-ring seal 46 is received within an annular recess in top cap 12 and seals the space between top cap 12 and outer housing 11 thereby serving to prevent fluid leakage from chamber 35 around washer 39 when piston check valve 34 is closed.

In order to provide communication of air into chamber 35 when piston check valve 34 is open, both top cap 12 and fitting 42 are provided with a series of apertures 47 and 48, respectively, angularly spaced apart relative to axis 36. Top cap 12 is provided with a decoratively shaped cap portion 49 which extends over apertures 47 but is spaced apart therefrom a sufficient distance so as to allow free flow of air therethrough while effectively hiding apertures 47 and interior portions of assembly 10 from view.

Extending horizontally from the upper and lower portions of piston check valve 34 are a series of guide spacers 40 and 41, respectively. In the preferred embodiment there are four guide spacers 40 and four guide spacers 41 each of which are equally angularly spaced apart 90° about valve 34. Guide spacers 40 and 41 are sized to permit fluid flow between opposed sides of piston check valve 34 when the valve is in its open position while guiding the movement of piston check valve in a linear direction along axis 36. Within the body of piston check valve 34 is formed a cylindrically shaped cavity 52. Loosely received inside cavity 52 is a tubular shaped stem 53 which is fixedly attached to body 30. Stem 53 extends upwardly into chamber 35 a sufficient distance such that piston check valve 34 will close the opening to stem 53 in its downwardmost (open) position. Also, the depth of cavity 52, distance which stem 53 projects into chamber 35 and length of chamber 35 in the direction of axis 36 are sized such that stem 53 will extend into cavity 52 when piston check valve 34 is in its uppermost position closing off opening 37. This ensures that water will not exit the vacuum breaker assembly through opening 37 before opening 37 is fully closed.

A duckbill check valve 55 is positioned in flow passageway 31 upstream of piston check valve 34. Duckbill check valve 55 is fixedly retained relative to body 30 by the lower end of stem 53 which may be press fitted or otherwise suitably secured to body 30.

Figure 6:
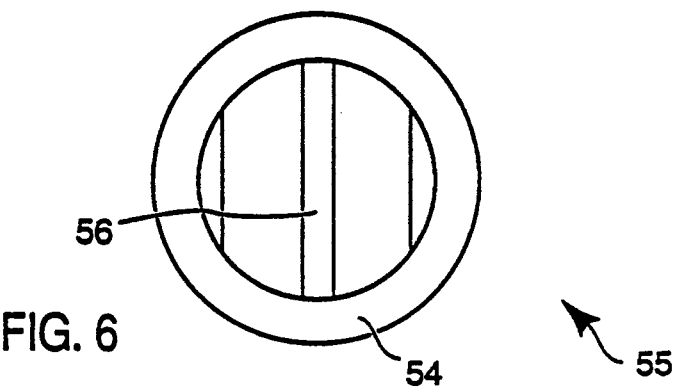
FIG. 6 is a top view of the duckbill check valve in its closed position.
Figure 5:
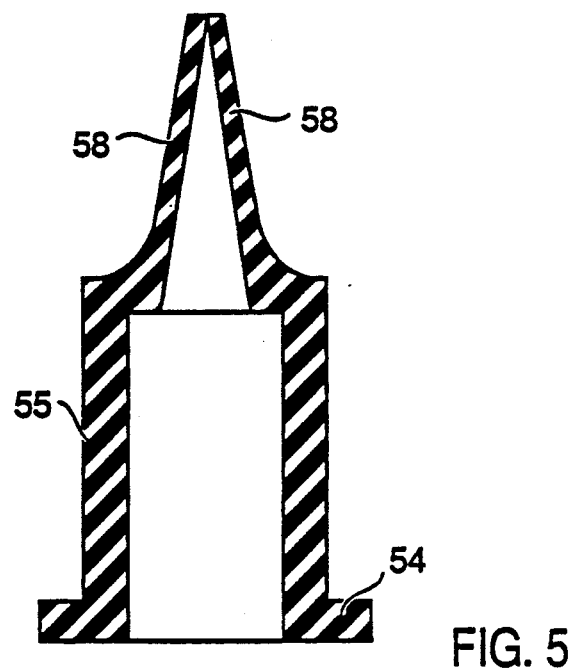
FIG. 5 is a full section view of the duckbill check valve.
Figure 7:
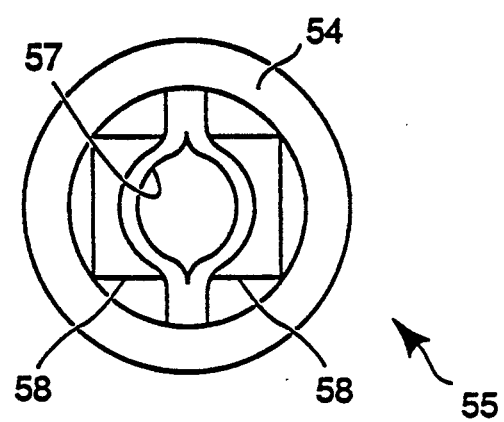
FIG. 7 is a top view of the duckbill check valve in its open position.

Details of the construction of duckbill check valve 55 are more clearly seen by reference to FIGS. 6-8. Valve 55 is of a unitary molded construction and is formed of a suitable flexible and resilient material which provides good sealing characteristics. The lower portion of duckbill check valve 55 is cylindrically shaped and has an annular flange 54 sized to overlie the lower end of stem 53 and retain valve 55 in its position within stem 53. The upper portion of valve 55 is in the shape of a duckbill and defines an inner passageway which tapers to zero width in a plane which is normal to the direction of the taper. The upper end of the duckbills 58 define a slit 56 which is normally closed but opens under pressure to form opening 57 (FIG. 8) to allow the flow of fluid therethrough. A suitable duckbill check valve is manufactured by Vernay Labs of Yellow Springs, Ohio, under part number VL-2654-101.

As seen in FIG. 3, fastener rod 60 mounted to the bottom of body 30 extends through a mounting hole formed in bracket 13 and is fastened thereto by screw nut 61 thereby securing body 30 to bracket 13.

In normal operation, water pressure from inlet 32 will force piston check valve 34 to move upwardly and seat against rubber washer 43 which closes vacuum breaker opening 37 while opening the outlet end of stem 53. At the same time, slit 56 in duckbill check valve 55 will assume the open position shown in FIG. 7, thus allowing fluid to flow upwardly through valve 55. When the douche bidet faucet handles 26 and/or 27 are turned on, water will flow upwardly through duckbill check valve 55 and stem 53, emerge through the outlet end of stem 53, flow downwardly between the outer surface of stem 53 and the inner surface of piston check valve 34 defining cavity 52, enter chamber 35 and thereafter flow downwardly into flexible discharge hose 14.

If for any reason there should be a loss in water pressure in the supply hose 15, piston check valve 34 will move downwardly under the influence of gravity and vacuum force, if any, until it rests upon the top of stem 53, thus closing passsageway 31 to reverse flow from outlet 33. At the same time, the duckbills on duckbill check valve 55 will assume their unbiased sealed configuration. The positions of valves 34 and 55 during a reverse flow situation is depicted in FIG. 3.

The purpose of duckbill check valve 55 is to provide backup protection against reverse flow conditions between inlet 32 and outlet 33 should piston check valve 34 become fouled and unable to acceptably limit back siphoning of liquid from bidet 18 into the potable water supply. The shape and resiliency of the duckbills allows the duck bills to seal even when fouled by relatively large objects which would prevent the piston check valve 34 from moving down sufficiently to close off reverse fluid flow from outlet 33 through the upper opening in stem 53.

The use of flexible hoses 14 and 15 considerably simplifies installation of vacuum breaker assembly 10 to conventional bidets by eliminating most on-site assembly requirements involved with vacuum breaker assemblies employing rigid pipe conduits. Also, tubular housing 11 and the skirted portion of mounting bracket 13 cooperate to hide otherwise visible portions of the lengths of flexible hoses from view, thereby enhancing the overall aesthetics of the design.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vacuum breaker assembly for a bidet, comprising:
    a vacuum breaker body defining a fluid passageway having an inlet, an outlet and a vacuum breaker opening communicating exteriorly of said vacuum breaker assembly to ambient air;
    a piston valve movably received within the fluid passageway of said vacuum breaker body, said piston valve moving between a first position wherein the vacuum breaker opening is open and a second position wherein the vacuum breaker opening is closed;
    a valve seal associated with said piston valve and the vacuum breaker opening in said vacuum breaker body, said piston valve defining a seating surface sized and shaped to close said vacuum breaker opening by sealing contact with said valve seal;
    a duckbill valve fixedly received within the fluid passageway of said vacuum breaker body in communication with said piston valve;
    first and second flexible conduits connected to the vacuum breaker body inlet and outlet in fluid communication with the fluid passageway; and
    a tubular housing connected to and extending from said vacuum breaker body, said tubular housing extending around said flexible conduits along at least a portion of the lengths thereof.

2. The vacuum breaker assembly of claim 1 wherein said duckbill valve is positioned upstream of said piston valve and said vacuum breaker assembly further comprising:
    a tubular stem mounted within said vacuum breaker body in fluid communication with the fluid passageway in said vacuum breaker body, said piston valve defining a cavity receiving said tubular stem, said tubular stem defining a stem outlet which is closed by said piston valve when said piston valve is in the first position wherein the vacuum breaker opening is open.

3. The vacuum breaker assembly of claim 2 and further comprising:
    a top cap mounted to said tubular housing and defining at least one aperture communicating with said vacuum breaker opening, said top cap including a cap portion extending over said vacuum breaker opening and spaced apart therefrom.

4. The vacuum breaker assembly of claim 3 and further comprising:
    an O-ring seal mounted between said top cap and said tubular housing in position to seal fluid flow between the inlet and outlet of said fluid passageway in said vacuum breaker body.

5. The vacuum breaker assembly of claim 2 wherein said piston valve is positioned within said vacuum breaker body for movement along a vertical axis.

6. The vacuum breaker assembly of claim 1 wherein said bidet having a basin, a shelf behind said basin, a drain for draining said basin, a lift rod actuating means mounted on said shelf for opening and closing said drain, a douche spray head in said basin and a douche spray head actuating means mounted on said shelf for actuating said douche spray head, and said vacuum breaker assembly further comprising:
    a mounting bracket connected to said tubular housing and having a U-shaped extension sized to mount to said shelf around said lift rod actuating means and said douche spray head actuating means of said bidet.

7. The vacuum breaker assembly of claim 6 wherein said mounting bracket is adapted to mount to the underside of said shelf and said mounting bracket includes a skirted portion extending downwardly from said tubular housing.

8. A vacuum breaker assembly for a bidet, comprising:
    a vacuum breaker body defining a fluid passageway having an inlet, an outlet and a vacuum breaker opening communicating exteriorly of said vacuum breaker assembly to ambient air;
    a piston valve movably received within the fluid passageway of said vacuum breaker body, said piston valve moving between a first position wherein the vacuum breaker opening is open and a second position wherein the vacuum breaker opening is closed;
    a valve seal associated with said piston valve and the vacuum breaker opening in said vacuum breaker body, said piston valve defining a seating surface sized and shaped to close said vacuum breaker opening by sealing contact with said valve seal;
    first and second flexible conduits connected to the vacuum breaker body inlet and outlet in fluid communication with the fluid passageway; and
    a tubular housing connected to and extending from said vacuum breaker body, said tubular housing extending around said flexible conduits along at least a portion of the lengths thereof.

9. The vacuum breaker assembly of claim 8 wherein said duckbill valve is positioned upstream of said piston valve and said vacuum breaker assembly and further comprising:
    a tubular stem mounted within said vacuum breaker body in fluid communication with the fluid passageway in said vacuum breaker body, said piston valve defining a cavity receiving said tubular stem, said tubular stem defining a stem outlet which is closed by said piston valve when said piston valve is in the first position wherein the vacuum breaker opening is open.

10. A vacuum breaker assembly for a bidet having a lift rod and diverter valve, comprising:

a vacuum breaker body defining a fluid passageway having an inlet, an outlet and a vacuum breaker opening communicating exteriorly of said vacuum breaker assembly to ambient air;

a piston valve movably received within the fluid passageway of said vacuum breaker body, said piston valve moving between a first position wherein the vacuum breaker opening is open and a second position wherein the vacuum breaker opening is closed;

a valve seal associated with said piston valve and the vacuum breaker opening in said vacuum breaker body, said piston valve defining a seating surface sized and shaped to close said vacuum breaker opening by sealing contact with said valve seal;

a tubular housing enclosing said vacuum breaker body; and a mounting bracket connected to said tubular housing and having a U-shaped extension sized to mount around the lift rod and diverter valve of said bidet.

11. The vacuum breaker assembly of claim 10 wherein said duckbill valve is positioned upstream of said piston valve and said vacuum breaker assembly and further comprising:

a tubular stem mounted within said vacuum breaker body in fluid communication with the fluid passageway in said vacuum breaker body, said piston valve defining a cavity receiving said tubular stem, said tubular stem defining a stem outlet which is closed by said piston valve when said piston valve is in the first position wherein the vacuum breaker opening is open.

12. A vacuum breaker for a faucet connected to a potable water source, comprising:

a vacuum breaker body defining a fluid passageway having an inlet, an outlet and a vacuum breaker opening communicating exteriorly of said vacuum breaker assembly to ambient air;

a piston valve movably received within the fluid passageway of said vacuum breaker body, said piston valve moving between a first position wherein the vacuum breaker opening is open and a second position wherein the vacuum breaker opening is closed;

a valve seal associated with said piston valve and the vacuum breaker opening in said vacuum breaker body, said piston valve defining a seating surface sized and shaped to close said vacuum breaker opening by sealing contact with said valve seal;

a duckbill valve fixedly received within the fluid passageway of said vacuum breaker body upstream of said piston valve;

first and second flexible conduits connected to the vacuum breaker body inlet and outlet in fluid communication with the fluid passageway; and a tubular housing connected to and extending from said vacuum breaker body, said tubular housing extending around said flexible conduits along at least a portion of the lengths thereof.

13. The vacuum breaker of claim 12 and further comprising:

a tubular stem mounted within said vacuum breaker body and defining a portion of the fluid passageway in said vacuum breaker body, said piston valve received around said tubular stem and defining therebetween a further portion of the fluid passageway in said vacuum breaker body, said tubular stem defining a stem outlet which is closed by said piston valve when said piston valve is in the first position wherein the vacuum breaker opening is open.

14. The vacuum breaker assembly of claim 13 and further comprising:

a top cap mounted to said tubular housing and defining at least one aperture communicating with said vacuum breaker opening, said top cap including a cap portion extending over said vacuum breaker opening and spaced apart therefrom.

15. The vacuum breaker of claim 14 and further comprising:

an O-ring seal mounted between said top cap and said tubular housing in position to seal fluid flow between the inlet and outlet of the fluid passageway in said vacuum breaker body.

16. The vacuum breaker of claim 13 wherein said piston valve is positioned within said vacuum breaker body for movement along a vertical axis.

17. The vacuum breaker assembly of claim 12 wherein said bidet having a basin, a shelf behind said basin, a drain for draining said basin, a lift rod actuating means mounted on said shelf for opening and closing said drain, a douche spray head in said basin and a douche spray head actuating means mounted on said shelf for actuating said douche spray head, and said vacuum breaker assembly further comprising:

a mounting bracket connected to said tubular housing and having a U-shaped extension sized to mount to said shelf around said lift rod actuating means and said douche spray head actuating means of said bidet.

18. The vacuum breaker assembly of claim 17 wherein said mounting bracket is adapted to mount to the underside of said shelf and said mounting bracket includes a skirted portion extending downwardly from said tubular housing.

* * * * *